INVENTOR.
JOHN GRECO

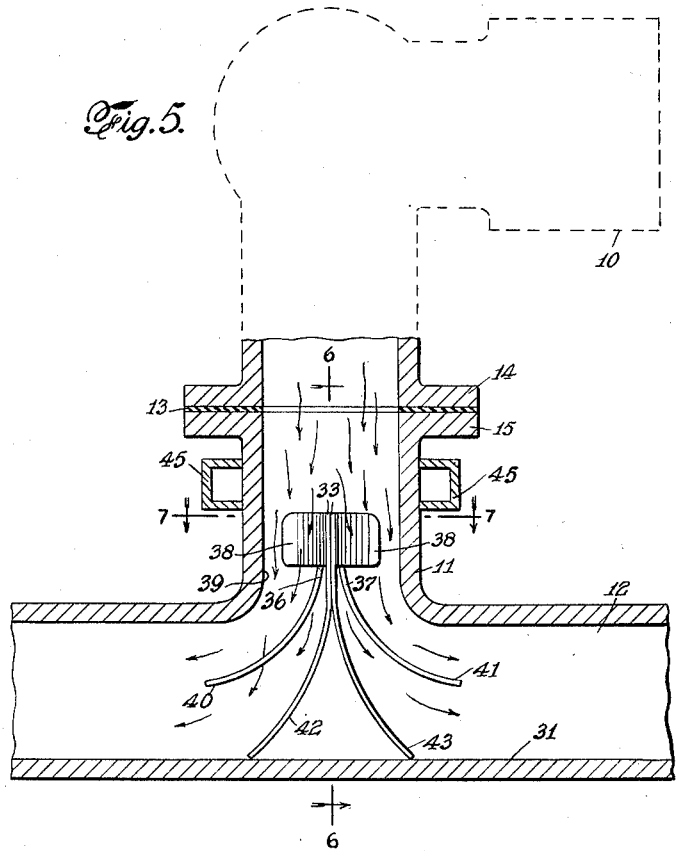
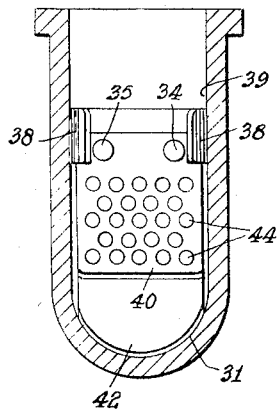
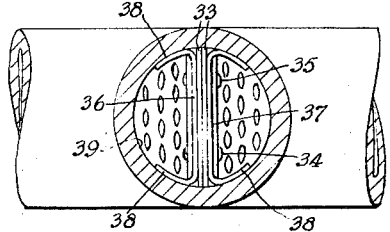
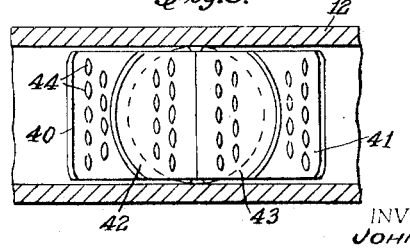

Patented Aug. 12, 1941

2,251,999

UNITED STATES PATENT OFFICE 2,251,999

VAPORIZER FOR AUTOMOTIVE MECHANISMS

John Greco, Brooklyn, N. Y., assignor of forty-nine per cent to Ferdinand Savignano and Angelo Graziano, both of Brooklyn, N. Y.

Application April 8, 1940, Serial No. 328,543

9 Claims. (Cl. 123—141)

This invention relates to a fuel vaporizer and distributor. More particularly it relates to a device adapted for internal combustion engines for vaporizing and gasifying the liquid fuel used in such engines.

The invention has for its objects the provision of a device used in combination preferably with the intake manifold of internal combustion engines for maintaining uniform mixture of the charge of gasoline and air passing therethrough, to increase the degree of admixture of gasoline and air with relative efficiency in the degree of vaporization, to increase the degree of combustion of the gasoline fuel admixed with the air, to increase the mileage power of such type of engine and to reduce the knocking in the engine by increasing the degree of vaporization of said fuel when mixed with the air.

Further objects of the invention are to provide a gasoline vaporizing and distributing device which is of simple construction, relatively inexpensive to manufacture and easy to assemble and means in combination with the intake manifold of an internal combustion engine.

With the above and other objects and advantages in view, the invention generally includes adjustable divergent winged members joined together having means for mounting the same in combination with the intake manifold of an internal combustion engine and means for retaining said winged members in position in said intake manifold. In the drawings:

Fig. 5 is a plan view of a modified embodiment of the invention herein.

Fig. 6 is a vertical view of a part of Fig. 5, taken on line 2—2 thereof.

Fig. 7 is a view taken on line 7—7 of Fig. 1, and

Fig. 8 is a sectional plan view of Fig. 6.

Figure 1:
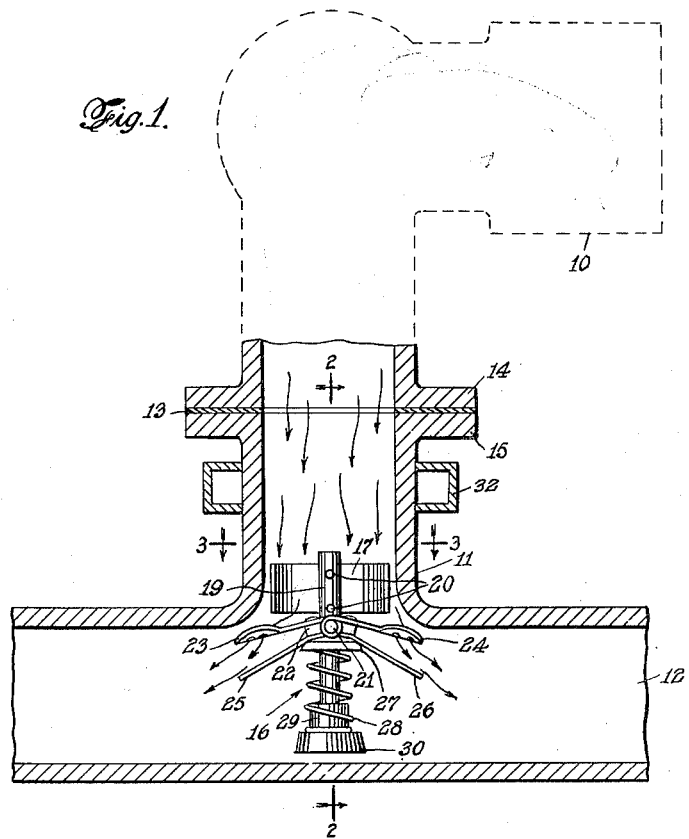
Fig. 1 is a plan view of an embodiment of the invention.

Referring now to Figs. 1 to 4 inclusive of the drawings in which similar character references relate to similar parts throughout, there is provided according to my invention, the conventional type of carburetor 10 in connection with a lead tube or ingress neck 11 of a conventional type of intake manifold 12, said carburetor and lead tube are joined together by ordinary means at their flanged portions 14 and 15 respectively between which is disposed a gasket 13. Disposed inside of the lead tube 11 and forming a tight fit with the inner wall thereof there is provided a vaporizing device 16 having a plurality of divergently curved spring leaf members 17 and 18 fixed onto an upwardly extending stem 19 and held in position thereon by means of pin members or rivets 20. Below said spring leaf members 17 and 18 there is disposed a cross pin 21 extending at right angles through stem 19. Mounted onto said cross pin 21 is a bisected hinged collar 22 onto which are fixed upper perforated vane members 23 and 24, and lower unperforated vane members 25 and 26.

The members 23, 25 and 24, 26 are respectively preferably formed from a single metal sheet for unitary movement relative to the pin 21.

Figure 2:
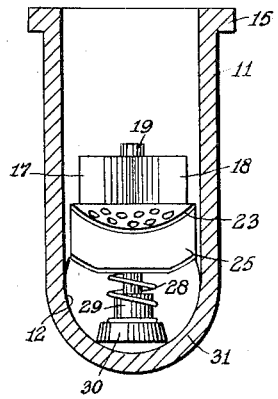
Fig. 2 is a vertical view of a part of Fig. 1, taken on line 2—2 thereof.
Figure 3:
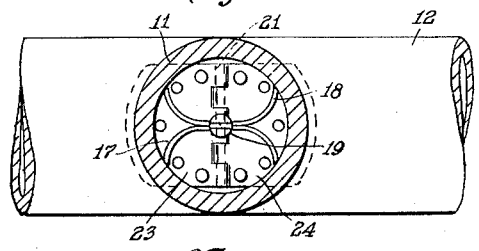
Fig. 3 is a plan view taken on line 3—3 of Fig. 1 and looking in the direction of the arrows thereof.
Figure 4:
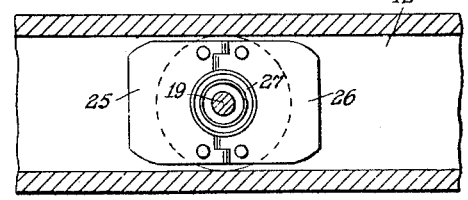
Fig. 4 is a sectional plan view of Fig. 2.

It is to be noted that members 23 and 25 are mounted on one section of said collar 22 so as to be disposed one above the other as shown, while vane members 24 and 26 are disposed one above the other and mounted onto the other section of hinged collar 22. Below said vane members 25 and 26 and adapted to move vertically of said stem 19 there is provided a curved collar 27 retained in upward position by means of a tensioned spring member 28 one of whose ends is fixed to the enlarged basal portion of said stem 29 and the other end disposed against the lower surface of said curved collar 27. By this means said vane members are adapted to be forced upwardly in such a position as to cover the diameter of the lead tube 11 whereby the fuel gasoline and air mixture when forced downwardly from the carburetor as shown by the arrows in the drawings, must pass through the perforations of said vane members before it can be drawn into the intake manifold 12. Said base 29 is mounted on and preferably integral with a supporting base member 30 whose edges are adapted to fit against the curved bottom of the interior of intake manifold 12 as shown in Fig. 2.

It is to be noted that spring leaf members 17 and 18 have the proper curvature so as to form a tight fit against the inner wall of lead tube 11 thereby permitting easy adjustment thereof. Also, because of its relative weight supporting base 30 rests solidly against the curved bottom wall of manifold 12. Upon increasing the accelerations of the vehicle using the type of device disclosed herein the gasoline fuel and air mixture are properly diverted so that it will be evenly distributed into the intake manifold.

Furthermore, by passing the gasoline and air mixture through the perforated vane members 23 and 24, under pressure there will be a tendency for the vane members to be forced downwardly thereby eliminating any tendency towards reducing the influx of the gasoline and air mixture.

The gasoline and air mixture passing through the carburetor 10 may be preheated from the preheating chamber 32 surrounding the lead tube 11 as shown. This type of preheater may be of any kind well known in the art.

In Figs. 5 to 8 of the drawings I have shown a modified embodiment of my invention, in which the metal retaining strips 36 and 37 are arranged at opposite sides of the contacting upper end portions 33 of the curved blades or vanes 42 and 43 respectively, while the corresponding end portions of the curved blades or vanes 40 and 41 are engaged with the outer side faces of the strips 36 and 37, said strips and the ends of the several blade members being rigidly secured together by the rivets indicated at 34 and 35. The free end portions of the metal retaining strips 36 and 37 are laterally curved in relatively opposite directions as indicated at 38 for resilient pressure contact against the inner surface of the wall of the ingress passage or lead tube 11 of the manifold. It will be noted that the blades or vanes 40 and 41 are spaced above the respective blades 42 and 43 and extend in laterally diverging relation to the latter, whereby a more or less uniform distribution of the liquid fuel mixture in opposite directions through the manifold 12 is effected. It will further be observed that the spaced ends of the blades 42 and 43 have bearing contact with the manifold wall to further stabilize the position of the device with respect to the manifold.

It is to be noted also that each of said blades has perforations 44 to permit and facilitate passage of the air-gasoline mixture being forced in from the carburetor as shown by the direction of arrows in Fig. 5. In order to increase the efficiency of combustion of the gasoline in the mixture a preheater 45 is provided around lead tube 11.

From the above description of my invention taken in conjunction with the accompanying drawings, it will be noted that I have provided a fuel vaporizing and distributing device which can be easily mounted in any type of internal combustion engine provided with an intake manifold system. The embodiments as disclosed are of simple construction and form a tight fit with the intake manifold to prevent displacement thereof. Furthermore, the gasoline air mixture when passing through this device is more uniformly distributed and at the same time more efficiently subdivided so as to increase the combustibility of the gasoline in the engine. The invention as disclosed will also permit thorough utilization of every bit of power and force contained in the gasoline thereby causing a saving in fuel expense. Furthermore, by increasing the vaporization of the fuel passing through said device, a larger proportion of air is required than otherwise, thus placing the fuel in an excellent condition for ready utilization, quick starting, smoother running and decrease in fuel consumption per mileage. While this invention has been described as being used in conjunction with internal combustion engines, it is to be noted that it is adapted also for engines of the fuel injection type in which case the liquid fuel may be one other than ordinary gasoline as now used in internal combustion engines.

While preferred embodiments of the invention have been described herein, it is to be noted that various changes as to form, structure, use and arrangement of parts may be made herein without departing from the spirit and scope of the invention as claimed.

I claim:

1. A liquid fuel vaporizing device comprising a stem, a pair of spring leaf curved members mounted on said stem, a plurality of perforated vane members hingedly connected to said stem and disposed below one of the marginal edges of said curved members and tensioned means mounted on the stem adapted to force said vane members upwardly against one of the marginal edges of said curved members.

2. A device according to claim 1 in which the stem member is provided with a supporting base member adapted to rest against the interior wall of an intake manifold of an internal combustion engine.

3. A vaporizing device for liquid fuel, comprising a pair of opposed curved members joined together at their central regions, divergently extending perforated vanes depending from said curved members, and means for retaining said curved members and vanes in relative position with respect to each other.

4. A fuel vaporizing device for internal combustion engines comprising a support and means for mounting said support in co-axial relation with the inlet neck of an engine intake manifold, a plurality of divergently related perforated members connected at one of their ends to said support, extending radially in opposite directions therefrom and adapted to contact at their other ends with the inner surface of the manifold wall, and a fluid flow directing member in opposed spaced apart relation to each of said perforated members, connected at one of its ends to said support and adapted to extend therefrom in non-contacting relation with the manifold wall and with its other free end extending longitudinally of the manifold flow passage and terminating adjacent to the axis thereof.

5. The vaporizing device described in claim 4 in which the perforated members are connected with the support by means permitting movement of said members relative to each other.

6. A vaporizing device for liquid fuel comprising a plurality of rigidly connected retaining members each having relatively free resiliently yieldable end portions adapted for pressure engagement with the inner surface of the ingress passage wall of an engine intake manifold, a plurality of radially disposed perforated vaporizing vanes to distribute the fuel mixture through the intake manifold, and means connecting said vanes at one of their ends with said retaining members.

7. In combination with a conduit for a fuel mixture having an ingress neck, a vaporizing device comprising resilient retaining means engaged with the inner wall of said ingress neck, relatively movable perforated vanes and means connecting the same with said retaining means, said vanes extending in opposite directions and in divergent relation to each other from said connecting means, and means yieldingly urging said vanes at their free ends into contact with the wall of said conduit.

8. In combination with a conduit for a fuel mixture having an ingress neck, a vaporizing device comprising supporting means having resiliently yieldable parts engaged with the inner wall of said ingress neck, pairs of spaced apart vanes, means for mounting said pairs of vanes for relative movement on the supporting means to extend therefrom in relatively opposite directions, and means yieldingly resisting relative movement of said pairs of vanes and normally holding one vane in each pair in contact with the wall of said conduit, said latter vanes being perforated, and the other vanes distributing the fuel mixture in relatively opposite directions thorugh said conduit.

9. A vaporizing device for gaseous fuel mixtures comprising a support, a plurality of pairs of vaporizing and distributing vanes mounted upon said support for relative movement, at least one vane in each pair being perforated, and means for yieldingly resisting movement of said pairs of vanes in relation to each other and with respect to said support.

JOHN GRECO.